A. S. TREW.
AUTOMATIC PNEUMATIC CARD TABULATING MACHINE.
APPLICATION FILED JUNE 21, 1918.

1,350,850.

Patented Aug. 24, 1920.
9 SHEETS—SHEET 1.

INVENTOR
BY
ATTORNEY

A. S. TREW.
AUTOMATIC PNEUMATIC CARD TABULATING MACHINE.
APPLICATION FILED JUNE 21, 1918.

1,350,850.

Patented Aug. 24, 1920.
9 SHEETS—SHEET 2.

INVENTOR
Arthur S. Trew,
BY
ATTORNEY

A. S. TREW.
AUTOMATIC PNEUMATIC CARD TABULATING MACHINE.
APPLICATION FILED JUNE 21, 1918.

Patented Aug. 24, 1920.
9 SHEETS—SHEET 3.

INVENTOR.
Arthur S. Trew
BY
Mack
ATTORNEYS.

A. S. TREW.
AUTOMATIC PNEUMATIC CARD TABULATING MACHINE.
APPLICATION FILED JUNE 21, 1918.

1,350,850.

Patented Aug. 24, 1920.
9 SHEETS—SHEET 4.

INVENTOR
BY
ATTORNEY

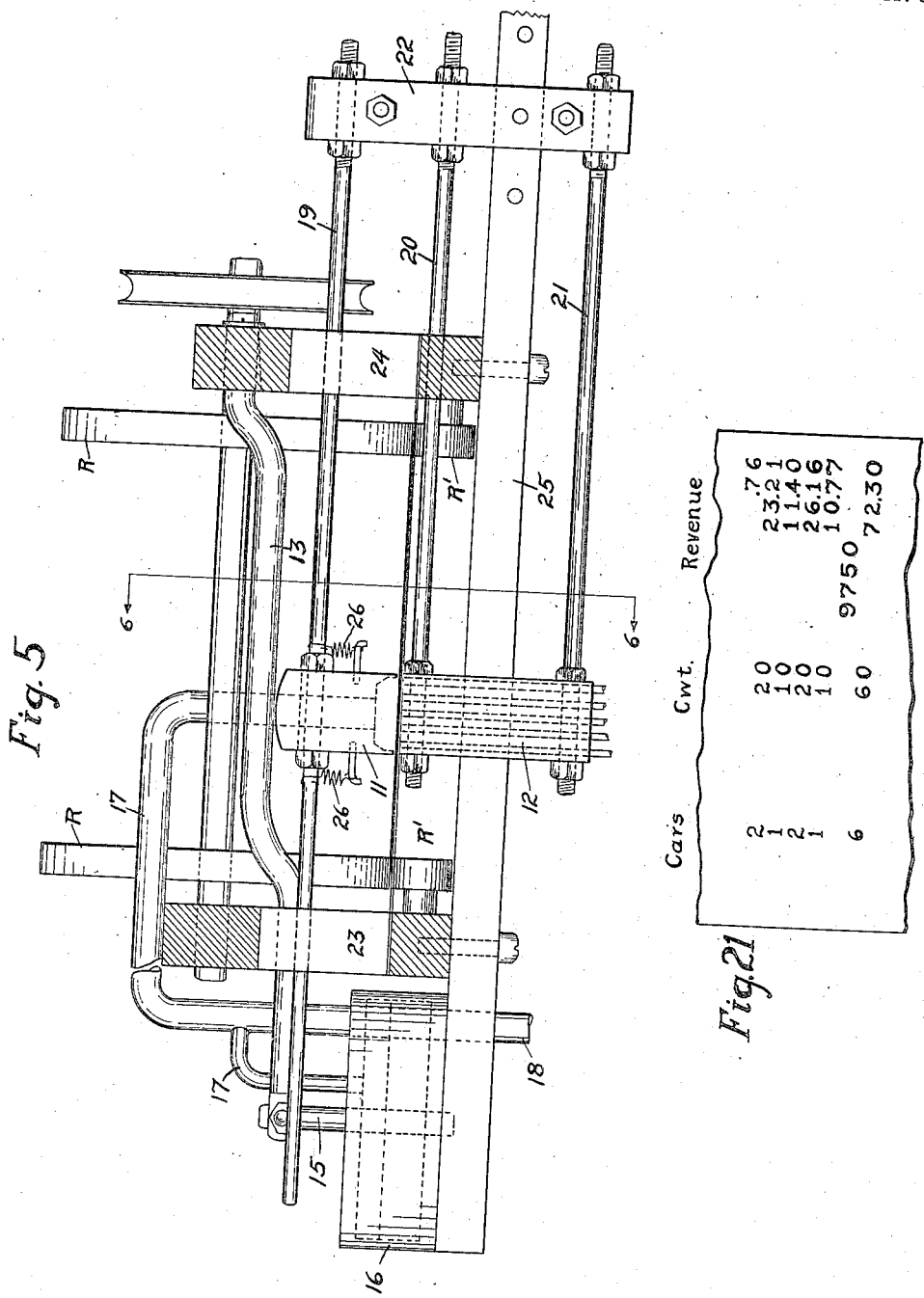

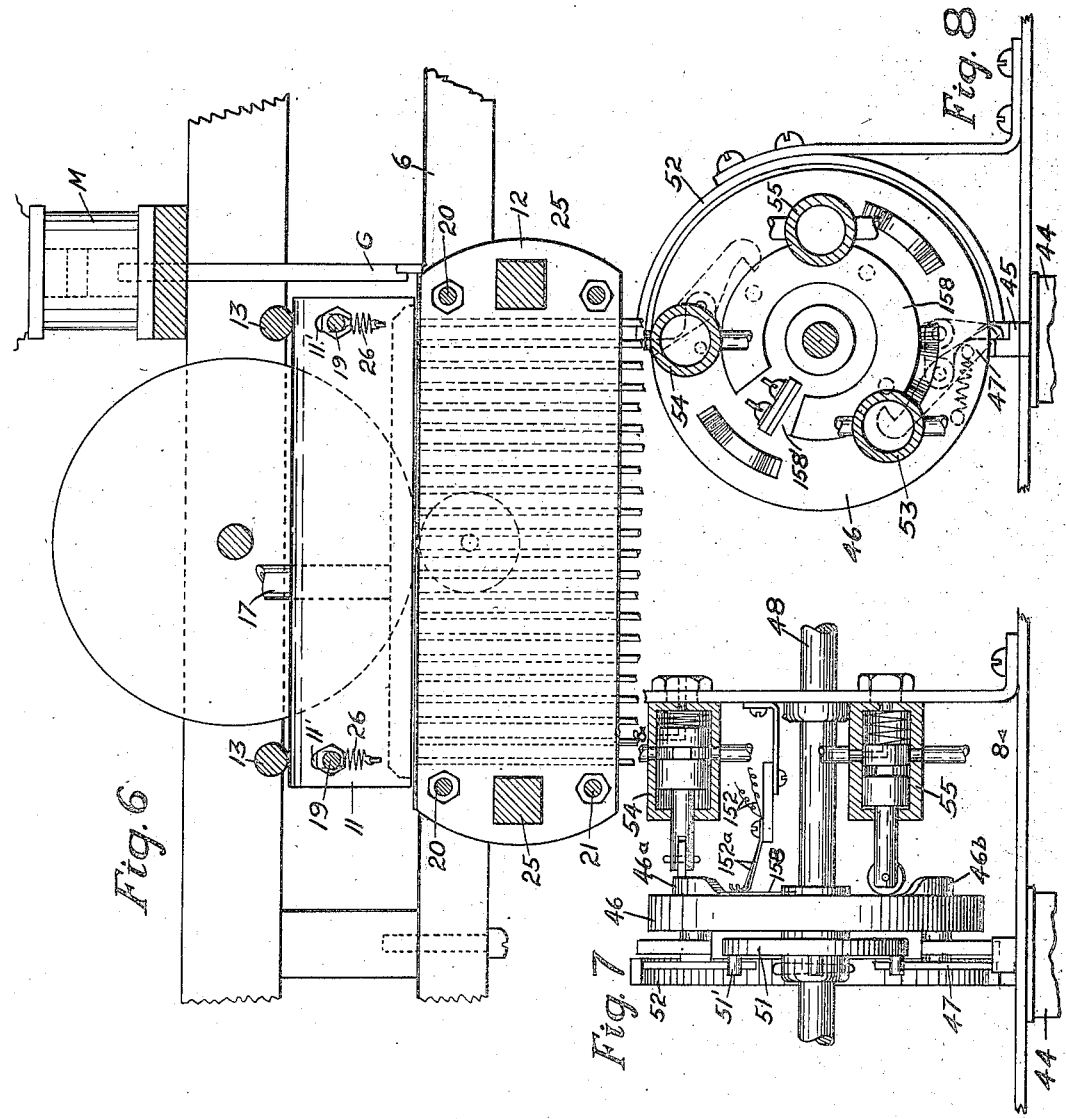

A. S. TREW.
AUTOMATIC PNEUMATIC CARD TABULATING MACHINE.
APPLICATION FILED JUNE 21, 1918.
1,350,850.
Patented Aug. 24, 1920.
9 SHEETS—SHEET 7.
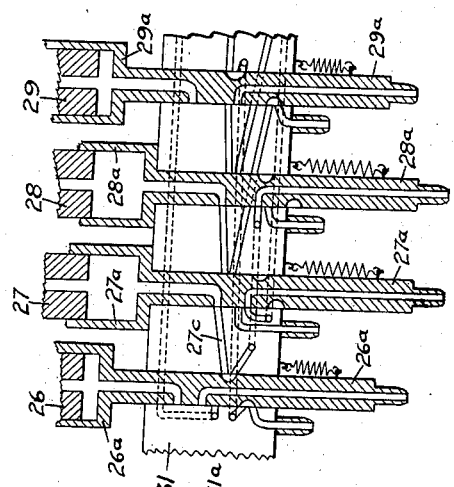
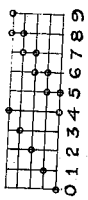
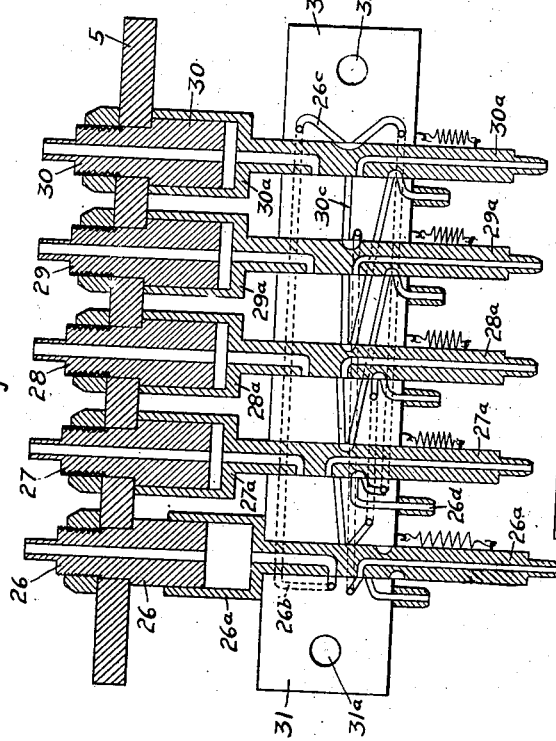

A. S. TREW.
AUTOMATIC PNEUMATIC CARD TABULATING MACHINE.
APPLICATION FILED JUNE 21, 1918.
1,350,850.
Patented Aug. 24, 1920.
9 SHEETS—SHEET 8.
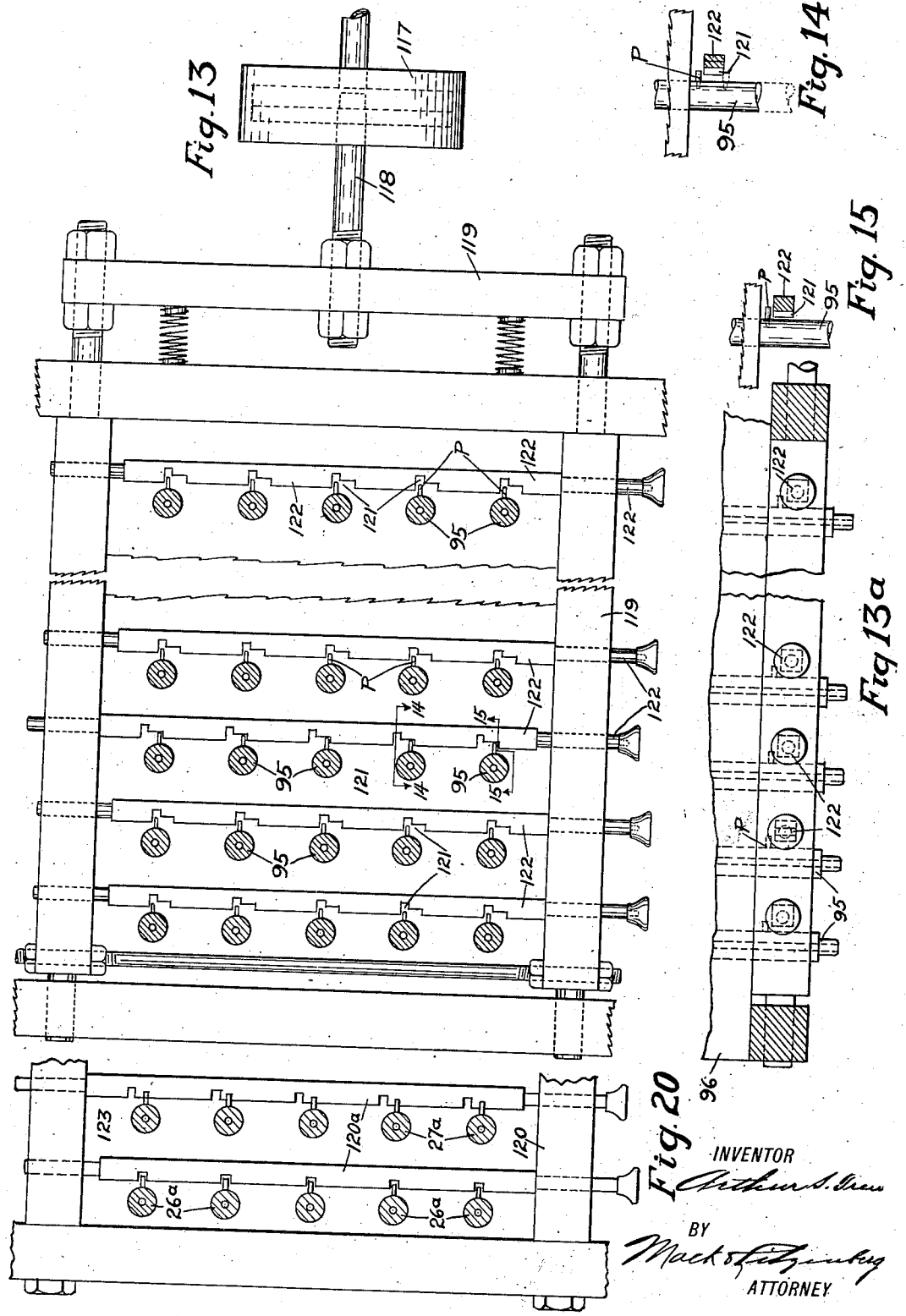

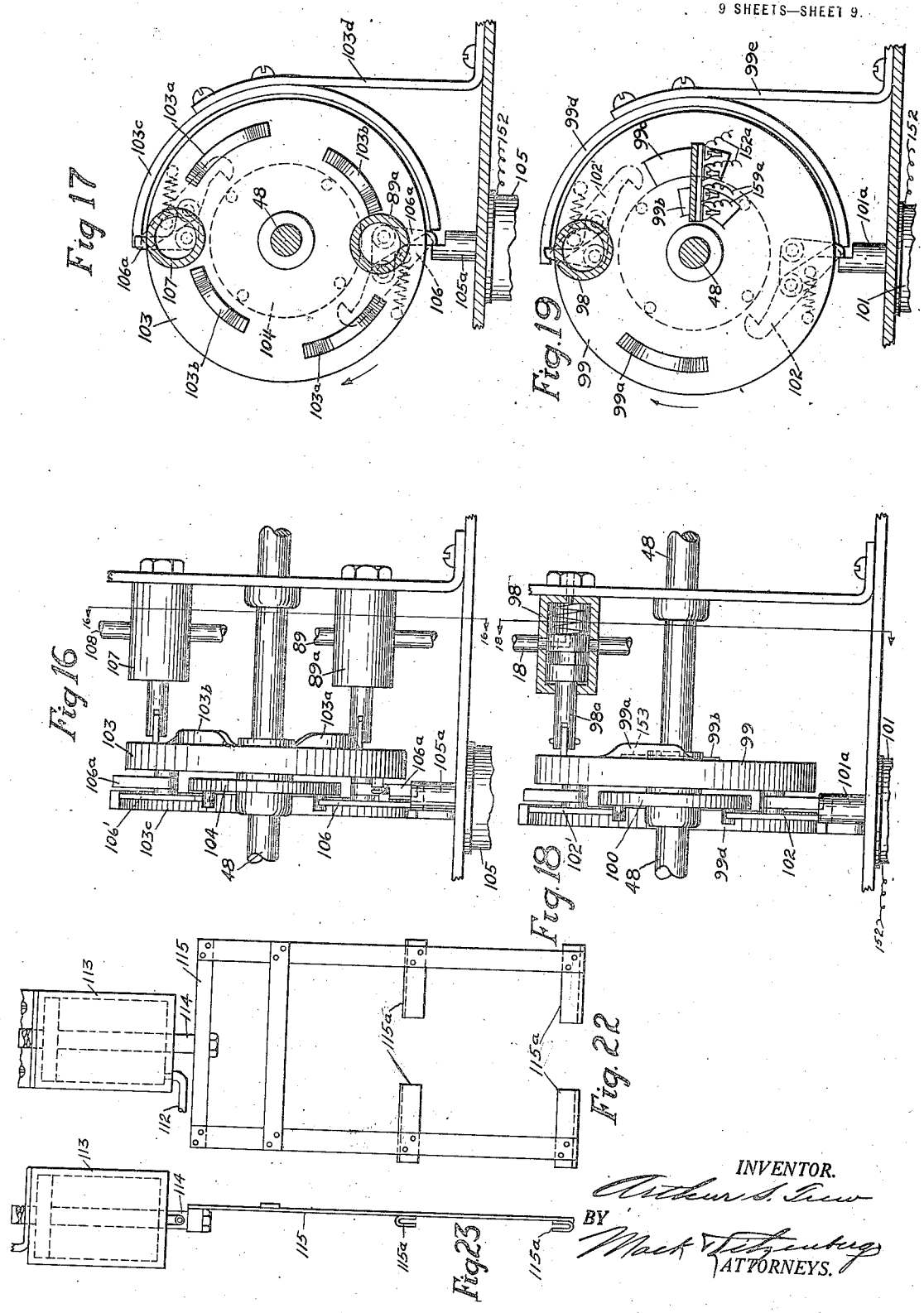

UNITED STATES PATENT OFFICE.

ARTHUR S. TREW, OF PORTLAND, OREGON, ASSIGNOR TO TREW TABULATING MACHINE COMPANY, A CORPORATION OF OREGON.

AUTOMATIC PNEUMATIC CARD-TABULATING MACHINE.

1,350,850.   Specification of Letters Patent.   Patented Aug. 24, 1920.

Application filed June 21, 1918. Serial No. 241,139.

*To all whom it may concern:*

Be it known that I, ARTHUR S. TREW, a citizen of the United States, residing in the city of Portland, county of Multnomah, and State of Oregon, have invented certain new and useful Improvements in Automatic Pneumatic Card-Tabulating Machines, of which the following is a specification.

My invention relates to automatic card tabulating machines, and more particularly to a machine by means of which data indicated on cards by means of record holes therethrough can be automatically listed upon a strip of paper in an adding machine operated thereby.

Among the salient objects of my invention are,—to provide a machine of the character referred to in which a series of cards can be automatically moved, one by one, to an operating position for causing the selective operation of the machine automatically for operating the adding machine and listing thereon the data indicated on said cards; to provide a machine of the character referred to adapted to automatically select or separate different groups of cards, to indicate the groups and to total the items of each group; to provide a machine of the character referred to which is electrically and pneumatically controlled according to the positions of the record holes through the cards passing through the machine; and in general, to provide a machine of the character referred to which is automatic in the action of ejecting and feeding the cards to a group selecting or group control position, then passing them on to an operating position for causing the selective operation of adding mechanism for listing the desired data on said adding mechanism, and then ejecting the cards from the machine.

Other objects and advantages of my invention will be apparent from the following detailed description of one practical embodiment thereof, taken in connection with the accompanying sheets of drawings illustrating the same, and in which,—

Fig. 5 is a fragmentary sectional view taken on line 5—5, Fig. 2;

Fig. 6 is a fragmentary sectional view taken on line 6—6, Fig. 5;

Fig. 7 shows an enlarged detail view of a cam wheel for controlling air valves and circuit contacts;

Fig. 8 is a sectional view taken on line 8—8 of Fig. 7;

Fig. 9 is a sectional view through a group of pneumatic control valves;

Fig. 10 is a similar view showing the valves in different positions;

Fig. 11 is a view of one of the cards the machine is adapted to handle;

Fig. 12 is a view showing a key for different combinations of holes to indicate different numerals;

Fig. 13 shows a locking mechanism for locking different groups of control valves against operation, when desired;

Figure 1:
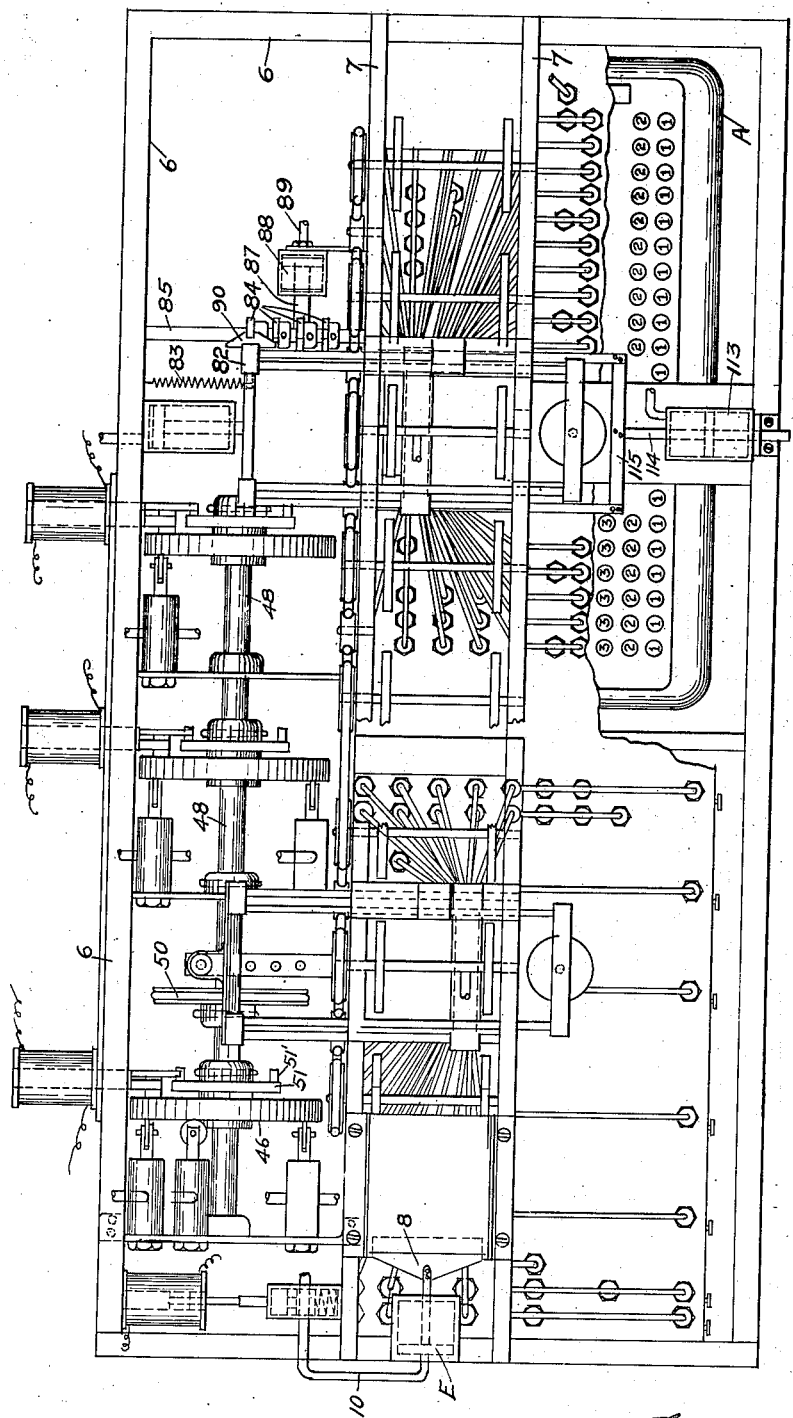
Figure 1 is a top plan view of one embodiment of my invention, with parts broken away.

Fig. 13ª is a partial edge view of the mechanism shown in Fig. 13;

Fig. 14 is a detail sectional view, on line 14—14 of Fig. 13, showing the locking pin on the valve in relation to the locking bar;

Fig. 15 is a similar view showing the locking bar moved bodily toward the valve stem whereby to engage the pin thereon, the lock bar being also moved inwardly, as shown in Fig. 13, third bar;

Fig. 16 is an edge view of a cam wheel for operating air valves;

Fig. 17 is a face view thereof;

Fig. 18 is an edge of another cam wheel for operating air valves;

Fig. 19 is a face view thereof;

Fig. 20 is a fragmentary view of a fixed valve locking device similar to the movable device shown in Fig. 13;

Fig. 21 shows a few (5) printed items taken from a group of five cards, the number of the particular group being shown, and also the totals of the different columns of items listed;

Fig. 22 is a top plan view of a card holding and moving device; and

Fig. 23 is an edge view thereof.

Referring to Fig. 11, I will first describe one of the cards having data indicated thereon, under certain headings, by means of record holes. Across the card horizontally are three different rows of headings.

The top row shows "Month; Day; M; Station from; Station to." Across the card, under said headings, are rows of twenty-two points or positions each, with rows of five points or positions in the opposite direction, or crosswise of the card vertically. In other words, there are 5 x 22, or 110 points or positions under each row of headings across the card horizontally. On the card shown, there are three such rows of headings and one row with no headings printed thereon.

The object of this invention is to provide a machine which will be automatically and pneumatically operated, controlled in its operation by the record holes through the cards passing therethrough, for operating an adding machine connected therewith for the purpose of tabulating on a strip of paper the data on said cards, and for totaling certain of said data. For example, if we have a pack of 100 cards, with ten cards of data from the same station, ten cards of data from another station, and eighty cards of data from another station, and it is desired to tabulate and add certain of the items under the headings "Cars; Cwt.; Revenue," in the lower row of headings on each of the cards. The cards are first segregated so that all of the cards of each group will be together. This is done in another machine for assorting cards. There are two sets of record holes in the cards, one set to classify the cards in groups, and the other to record certain data. The cards are then all put into this machine, one group on top of another, and the machine set and started. The machine automatically operates the adding machine to which it is connected and prints the data indicated on the cards under these different headings for each station. At the end of each group, the designating number of the station is printed and the totals of the items from the station under each of the headings "Cars; Cwt.; Revenue" are printed. As the machine continues, the items under the second station are listed, the station number is printed, and the totals are printed, and so on through the items for the next station. It will be understood, of course, that the items or data on the cards under the different headings are indicated by numerals, printed and punched, certain holes and combinations of holes being used to indicate the numerals 0 to 9, as per key Fig. 12.

Figure 2:
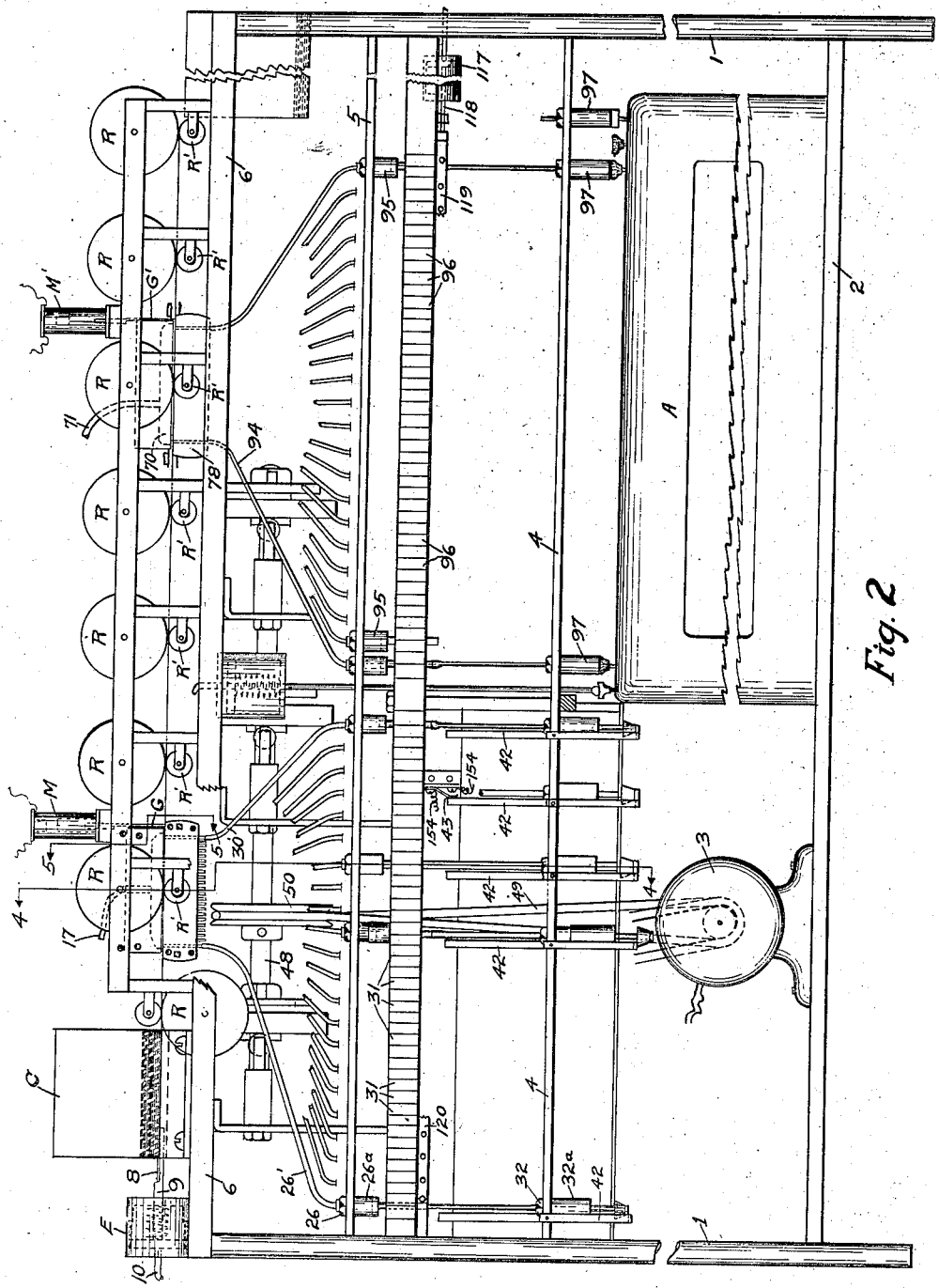
Fig. 2 is a front elevation thereof, with parts broken away and omitted.

Referring first to Fig. 2, I will indicate briefly the ejection, course of travel and the stopping positions of the cards as they are carried through the machine. The cards are placed in a holder or container C, from the bottom of which they are ejected, one by one, by a pneumatic ejector E, in a flat position, and carried to a stop gate G (see also Fig. 6), where they are momentarily stopped for a purpose hereinafter described. The cards are then moved on by feed rollers R and R' to a second stop gate G'. Said stop gates are electrically operated by means of magnets M and M'. In the first stop position, at gate G, if a card from another station than those which preceded it comes to this stop position, that is, if a card having a different number indicating a different group, by a different combination of record holes, comes to the stop gate G, the machine is automatically operated to operate the adding machine for printing the number of the station on the preceding cards, and totaling the data on said cards from this particular station. The last card of the preceding group of cards will be in the second stop position G', but the new card in the first stop position G, will cause this action of the machine. This first stop position may, therefore, be properly referred to as a group selector, or group control. Of course if a stray card appears at this station by accident, the machine will be operated to indicate it. This action takes place before the new card passes from the first gate G to the second gate G'. As the cards come to the first stop position G (see Fig. 3, in which the cards are indicated as traveling toward you), they break certain electric circuits which control the magnet M, which opens the gate. When the card moves to the second gate G', it is stopped in a position whereby the pneumatic mechanism operates through the record holes in said card to press the keys of an adding machine, indicated as A, for listing on the paper of the adding machine the data on the cards.

I will now describe in detail the structure of the machine as here shown. The mechanism is supported upon a table like structure, comprising the four corner legs 1, 1, 1, 1, provided with a lower shelf 2, on which an adding machine A, is set, and also a driving motor 3. An intermediate shelf 4, an upper shelf 5, and a top supporting frame 6, form parts of the general supporting structure. The supporting members 7, 7, are extended longitudinally across the middle of the top frame 6, as indicated in the top plan view, Fig. 1.

The cards containing the data to be tabulated and totaled on the adding machine A, are placed in a holder or container C, in which they are supported so that they can be ejected, one by one, from the bottom thereof by means of an ejector plate or blade 8, on a plunger rod 9, connected with a piston within the cylinder E, as indicated in dotted lines Figs. 1 and 2. Said ejector is air operated in one direction and spring returned, as clearly indicated in dotted lines, Fig. 2, an air pipe 10 being connected with the outer end of the cylinder and connected with any suitable supply of air under pressure. The ejected cards are carried forwardly flatwise by the feed rollers R, R', until stopped by the gate G, which is moved by an electric magnet M, the circuits for which will be hereinafter referred to. The cards are thus stopped between an air shoe 11, and an air head or block 12. Said air shoe 11 is movably mounted under a lever 13, which is pivoted at 14, and has its opposite end connected with a piston 15, operating in a cylinder 16, Fig. 3. An air tube 17 is connected with the air shoe 11, with a branch pipe connected to said cylinder 16, said air tube being connected with an air supply pipe 18, as clearly shown in Fig. 3. Thus when air is admitted to said air shoe 11, it is also admitted to said cylinder 16, with the result that the piston is moved downwardly and the air shoe 11 is moved down upon the card which has been stopped by the gate G, said air shoe 11 having the vertical slots 11', 11', therein as indicated in Figs. 5 and 6. The air shoe 11 has a concaved or recessed card-engaging face which covers the card area under the row of headings being used. The air block 12 is provided with a series of air passageways, corresponding in number and positions to the number of positions or hole points under one row of headings on the card, as hereinbefore referred to. That is, there are five in each row in one direction and twenty-two in each row in the other direction, or lengthwise of the card, and also of the block. Said air shoe 11 and the air block 12 are moved together in either direction, being mounted on a supporting frame comprising the bars 19, 20 and 21, connected at one end to a cross head 22. The rods 19 works through stationary frame members 23 and 24. The air block 12 also slides on bars 25, 25, by which it is held steady. The air shoe 11 is vertically movable and is provided with the slots 11', 11', for this purpose, as before referred to. Thus it is possible to move the air shoe 11 vertically down on to the card, and also to move said air shoe 11, and said air block 12, to different positions on the bars 25, 25, in order to position them over the different rows of headings on the cards, as desired. The air shoe 11 is normally raised by the springs 26, Fig. 6. Each of the cards of the different groups is stopped in this first position momentarily. If the last card of one group has passed the first stop position and the card from another group there appears, that is, a card in which the record holes are in different positions, representing a different number, the mechanism is thereby caused to be automatically operated so as to operate the adding machine and print the number of the last card of the preceding group, now standing at the second stop position over the adding machine, on the paper and also to print the total of the items on the preceding group of cards. This is done just preceding the starting of the next group of cards through the machine. In other words, this mechanism automatically separates the different groups, lists on the paper in the adding machine the items of each group, prints the number of the group and also the total at the end of each group of items.

Figure 4:
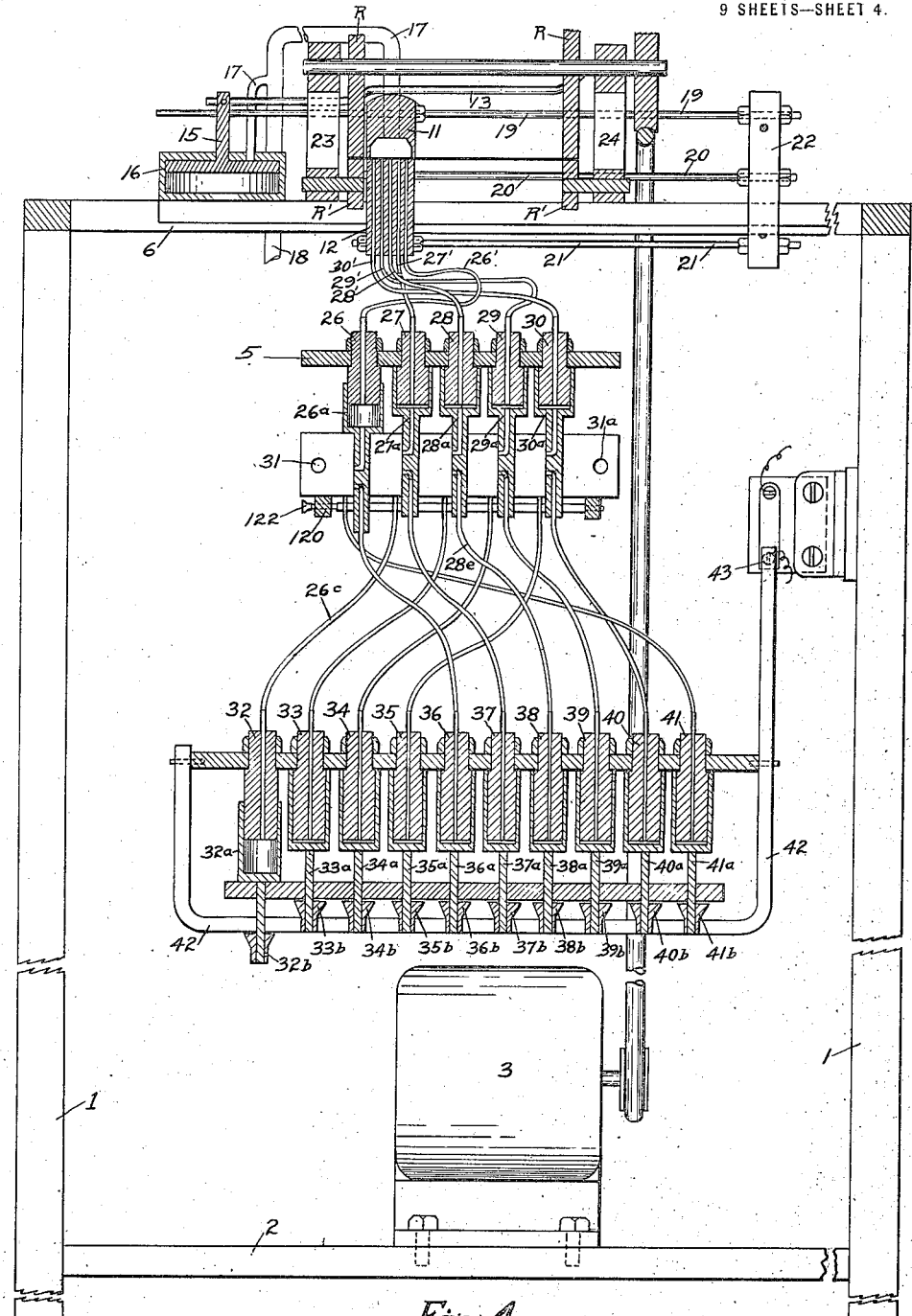
Fig. 4 is a vertical, transverse sectional view taken on a line at 4—4 of Fig. 2.

I will now describe this mechanism and its operation. Referring first to Figs. 4, 9, 10, 11 and 12, there is an air control valve for each passageway in the air head or block 12. In Figs. 4, 11 and 14, five of these air control valves are shown, corresponding to the row of five air passageways arranged crosswise of the air block 12. These air control valves are designated 26, 27, 28, 29 and 30. Each valve comprises a fixed member supported in the shelf 5, and has connected thereto a flexible tube connecting it with the corresponding passageway through the air head 12, clearly shown in Fig. 4. Said tubes are designated, 26', 27', 28', 29' and 30'. Each valve has a cup-like movable part telescoping therewith, with a valve stem extending through a valve block 31. Said movable parts are designated $26^a$, $27^a$, $28^a$, $29^a$ and $30^a$. When air under pressure is permitted to pass from the air shoe 11, through the hole or holes in the card which is in between the air shoe 11 and the air block 12, said air passes through the particular air passageway or passageways in register and into the corresponding control valves and forces the movable parts of the valves downwardly. In Figs. 4 and 9, the valve $26^a$ and its stem is moved downwardly in the valve block 31. In Fig. 10, valves $27^a$ and $28^a$ are shown down. The valve block 31, through which the valve stems of the control valves work, is provided with circuitous passageways therethrough adapted to be connected up with passageways in the valve stems, whereby to select and control operating valves 32, 33, 34, 35, 36, 37, 38, 39, 40 and 41, shown in Fig. 4. There are ten of these operating valves shown connected up with five control valves. It requires all of the five control valves, singly and in pairs to cause the operation of any one of the ten operating valves. For example, in Fig. 9, control valve $26^a$ is down. This permits air under pressure to pass through the valve block 31, through the passageway designated in dotted lines $26^b$, which continues from the stem lengthwise through the valve block 31 to the position $26^c$, where said passageway registers with an indent in the side of the stem of control valve $30^a$. If this control valve $30^a$ were down, then this passageway would be cut off and closed at this point. This passageway $26^c$ is shown in full lines at this point because it is in the inner face of the valve block section, said valve block being made in sections, and it takes the next block section to complete or cover the passageway at this point. The passageway continues to and out through the tube 26$^d$, as shown in dotted lines. This discharge tube is connected by an air tube 26$^e$ to operating valve 32, Fig. 4. These valve block sections are shown in end views, close together in Fig. 2. They are clamped together by means of bolts or rods 31$^a$. Referring to Fig. 10, two control valves 27 and 28 are shown in down or operating positions. This is caused by the fact that air is passing through two of the passageways through the air block 12, these passageways being a combination of two holes in the card, according to the key in Fig. 12, for indicating the numeral 6. That is, points or positions 1 and 2, according to the key, represent the numeral 6. Therefore, control valves 27 and 28, corresponding in their positions to the positions 1 and 2 of the key, are operated. These two control valves 27 and 28, as shown in Fig. 10, open but a single passageway, because of the combination of passageways through the valve block 31. The passageway designated 27$^c$ extends from the stem 27$^a$, to and through stem 28$^a$, the end of which is connected by the tube 28$^e$ to the operating valve 38. Thus it will be seen that according to the positions of the record holes through the cards being handled, the control valves, either singly or in pairs, are opened to permit the passage of air to the proper operating valves, designated 32 to 41, respectively. If a card in the first stop position has holes to indicate the numeral 4, by reference to the key, Fig. 12, it will be seen that the first and 5th positions, in combination, make 4. Therefore the control valve 26, occupying the first position, and control valve 30, occupying the 5th position, would be moved to their down positions because the air is admitted thereto through the holes in the card for 4. Referring to Fig. 9, control valve 26 is already down and the air would start through passageway 26$^b$ as before, but inasmuch as control valve 30 would also be down, the passageway 26$^b$ would be closed at 26$^c$, for the reason that the stem 30$^a$ would be down. The air therefore, cannot pass through valve 26, but must pass through valve 30, its passageway being in register with the passageway 30$^c$ in the valve block 31, and thence to and out through the passageway in the valve stem 26$^a$, which is connected to operating valve 36, or the operating valve for the number 4, it being remembered that valve 32 is 0.

The operation of these operating valves 32 to 41, as here shown, is for the purpose of moving or rocking a bale 42, which controls an electric contact at 43. There is a corresponding bale and contact for each series of operating valves. The bale for each group of five valves is rocked by cam blocks, as 32$^b$, 33$^b$, 34$^b$, 35$^b$, 36$^b$, 37$^b$, 38$^b$, 39$^b$, 40$^b$, and 41$^b$, on the lower ends of the plungers or stems of the operating valves 32 to 41. The cam blocks not only rock the bale 42, but they catch on said bale after rocking it and passing it and are held down by the bale, as shown in Fig. 4, until another operating valve is depressed. Thus when all of the cards passing the first stop position are from the same station, for example, all having the same general number, the mechanism remains set until all of the cards of that group, or from that particular station or class, have been carried through the machine. As soon as a card appears from another station, and it is differentiated by another number for its station, represented by a different set of holes, the corresponding control valve or combination of control valves, 26 to 30, is operated, resulting in the operation of a different operating valve. This operating valve rocks the bale 42, which releases the cam block 32$^b$, of operating valve 32, and permits it to return to normal position, while the operating valve moved swings the bale and is caught thereby and remains down until all of the cards of this group have passed the first stop gate G. Thus the machine automatically adjusts itself whenever the holes in the next card are differently positioned, as they are for different groups or classifications. The first card of a new group, in the first stop position G, causes the machine to operate so as to take the group number from the last preceding card, which is in stop position G', and also to total the items of the preceding group, as shown in Fig. 21. In this figure, the row of figures at the right indicate the items under the heading "Revenue," the last number being the total of the items above it. The number to the left is the station number, that is, these items are from station 9750. The other columns to the left are the items under "Cwt." and "Cars" also totaled.

Figure 3:
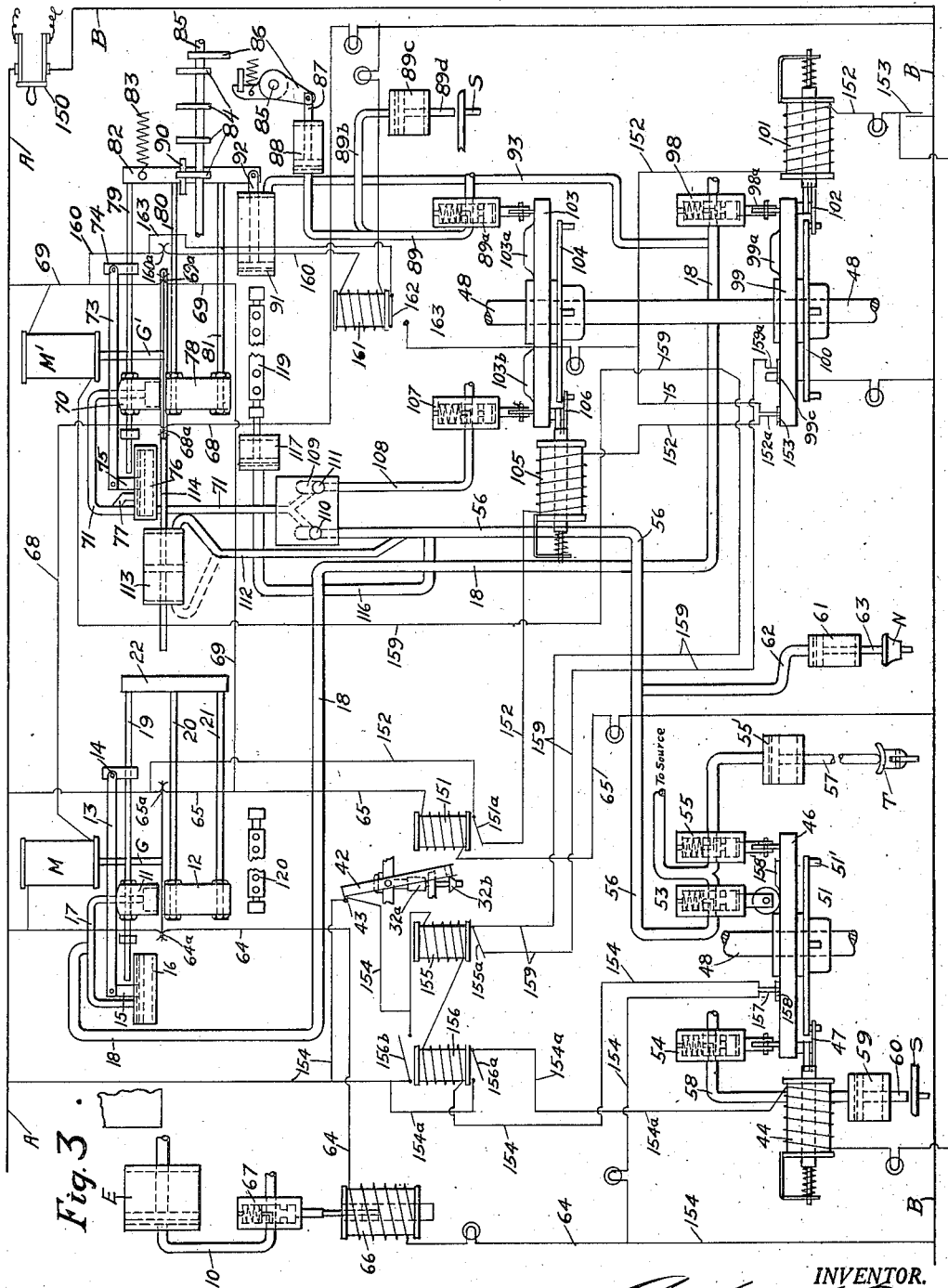
Fig. 3 is a general diagrammatic view showing the electric and pneumatic connections for the control of the machine.

I will now describe how this mechanism operates automatically to cause the number of the group or series to be printed after the last card has been carried from the first stop position or gate G to the second stop position at gate G', and prints the total of the items listed from the cards of the group which has just been carried forward. The movement of the bale 42 closes a contact 43, Fig. 3, which closes a circuit to magnet 44, which operates to withdraw its armature 45, and thereby release a cam wheel 46, and also a pawl 47 mounted thereon, Figs. 7 and 8. The cam wheel 46 is mounted loosely on a shaft 48, which is driven continuously during the operation of the machine from the motor 3, by a belt 49, to a pulley 50 on said shaft. Secured to said shaft adjacent said cam wheel 46, is a driving disk 51, provided with four pins 51′ When the pawl 47 is released with the cam wheel 46, said pawl catches one of the pins 51′ and said cam wheel 46 is turned therewith a half of a revolution only, there being a similar stop and pawl on the opposite side of the cam wheel 46 which engages the armature 45, which has been released and again projects in the path of said stop. The pawl 47 is automatically released from the pin 51′ by a trip rim 52, as clearly shown in Figs. 7 and 8, which trip rim also holds it in inoperative position until it makes its half revolution. The cam wheel 46 is provided on its face with cam lugs 46ª, 46ᵇ and 46ᶜ. These cam lugs are positioned to operate plungers of air valves 53, 54 and 55, for controlling the admission of air under pressure from any suitable source to the different mechanisms, as generally shown in Fig. 3 and hereinafter again referred to. When valve 53 is operated, it admits air to a connection 56 for a function hereinafter referred to. When valve 55 is moved, it admits air to a cylinder 55′ to operate its plunger 57, which depresses the total key T of the adding machine. When the valve 54 is moved or operated it admits air under pressure to an air tube 58 leading to a cylinder 59 for operating a plunger 60, which depresses the stroke bar S of the adding machine. When valve 53 is operated to admit air to pipe 56, said air is also carried to a cylinder 61, through tube 62, for operating a plunger 63, which depresses the non-add key N of the adding machine. When a card takes the first position at gate G, it breaks two circuits, 64 and 65, at 64ª and 65ª, as indicated in Fig. 3. Circuit 64 controls the magnet 66, which moves the valve 67, controlling the air supply to the ejector E. When said card moves forwardly from the first stop position G, thus permitting circuit 64, at 64ª, to be completed, another card is ejected and carried forward to the first stop gate G. When the card enters the second stop position G′, it breaks circuits 68 and 69, at 68ª and 69ª. When the card leaves this second position at gate G′, the circuit 68 is closed, energizing gate magnet M, to open gate G at the first stop position, thus permitting the card at that point to be carried forwardly to gate G′.

Referring to Figs. 2 and 3, there is provided at the second stop position, gate G′, a second air shoe 70, having connected therewith an air supply pipe or tube 71, and being movably mounted the same as is air shoe 11, on the lever 73, pivoted at 74, and at its opposite end connected with a plunger 75, in an air cylinder 76, having an air tube 77, connected therewith for operating said plunger and moving said air shoe down upon the card, the same as hereinbefore described for the other stop position. A second air block or head 78 is also provided. This is similar to air block 12, previously described, and shown in large view in Fig. 6. Said air head 78 is mounted on rods 79, 80 and 81, attached at one end to a head 82, normally drawn to the right by a spring 83, when released by latches 84, on a shaft 85, adapted to be momentarily rocked by an arm 86, which is operated by a plunger 87, in a cylinder 88, having an air supply tube 89 connected therewith, as shown, and controlled from an air valve 89ª, interposed between it and the source of supply. A branch air tube 89ᵇ extends to cylinder 89ᶜ, having a plunger 89ᵈ for operating the stroke bar S of the adding machine. The latches 84, of which four are shown, engage in a notched piece 90, carried by the head 82. Said latches and notched piece are also shown in a plan view in Fig. 1. Said head 82, together with its rods 79, 80 and 81, and the air shoe 70, and the air block 78, are moved to the left by air admitted to a cylinder 91, having a piston 92, connected with said head 82, air being supplied to said cylinder by air tube 93. The air block or head 78 is provided with air passageways, the same as those in air block 12, from which lead air tubes, 94, 94, connected with control valves 95, like the control valves 26 to 30, and operating through valve blocks 96, similar to valve blocks 31, and connected with operating valves 97, 97, similar to the operating valves 32 to 41. These operating valves are positioned to set over the keys of an adding machine A and to operate said keys whenever they are moved by the admission of air thereto, controlled by the control valves, which are controlled by the cards between the air shoe 70 and the air block 78, according to the position and number of the holes through said cards. The air supply pipe 93 which supplies the air to cylinder 91 for moving said air shoe 70 and air block 78, connects with air tube 18, from the first stop position. The air valve 98 controls the admission of air to said pipe or tube 18 from any suitable source of supply. Said air valve 98 is controlled or intermittently operated by a cam wheel 99, similar to cam wheel 46, on the same shaft 48. Said cam wheel 99, Figs. 18 and 19, is provided on its face with a cam lug 99ª, adapted to engage and operate the plunger 98ª of the air valve 98. Said cam wheel 99 is also provided on its face with two contact plates 99ᵇ and 99ᶜ for completing the circuit 159, at 159ª, and the circuit 152, at 152ª, during the time said contact plates move under the terminals at 159ª and 152ª. A driving disk 100, similar to driving disk 51, is mounted on said shaft 48, adjacent said cam wheel 99, for intermittently locking it to said shaft 48. Said cam wheel is released by a magnet 101, which controls a latch at each side of the wheel, designated 102 and 102′. These latches are moved out of locked engagement with the driving disk 100 by means of a release rim 99ª, supported on a bracket 99ᵉ, and extending half way around the cam wheel, as will be seen in Fig. 19.

Air valves 89ª and 107 are also intermittently operated by a similar cam wheel 103, having two pairs of cam lugs on its face and designated 103ª, 103ª, and 103ᵇ, 103ᵇ, and occupying different distances from the center of said cam wheel, as will be clear from Fig. 17, and each pair being positioned to act on different latch members 106, 106ª, also differently positioned with relation to the center of the cam wheel. This cam wheel is intermittenty locked to the shaft 48 by an operating disk 104. The cam wheel is released by a magnet 105, controlling the latch stop 106, by means of its armature 105ª. The air valve 107, controls the admission of air to an air tube 108, connected with the valve block 109, with which also connects pipe 56, as clearly shown in Fig. 3. Ball valves 110, 111 control the communication of said pipes 56 and 108 with the single pipe 71, from the air shoe 70, and the operating cylinder 76. Also running from pipe 56 is a branch pipe 112, connected with the cylinder 113, having a piston 114, connected with a card moving frame 115, for moving the cards in the second stop position, at gate G′, so as to bring another heading thereof under the air shoe 70, as when it is desired to take the number under "Station to." Referring to Figs. 22 and 23, it will be seen that the piston 114 is connected with a card carrying frame, 115, having two spaced channel members 115ª, 115ª, between which the card rests when in the second stop position, thus making it possible to move the card bodily while in this position to bring a different portion of the card under the air shoe 70, for the purpose indicated.

A branch pipe 116, from said pipe 56, connects with the cylinder 117, having a piston 118, for automatically moving a control valve locking frame 119. This mechanism is shown in larger view in Fig. 13. A similar locking frame 120, is shown in Figs. 2, 4 and 20, for the first stop position, except that this locking frame is rigid and only its stop bars or keys are movable to lock any particular set of five control valves. Referring to Fig. 20, the locking mechanism for the control valves 26ª to 30ª, comprises notched lock bars or keys 120ª, 120ª, the notches of which are normally positioned to allow the pins P on the control valves to move therethrough. When it is desired to lock any set of control valves, it is only necessary to push in the lock bar 120ª, as shown in Fig. 20, and the body of the bar is then below the pin P and will be engaged thereby to prevent the control valve from operating.

The locking frame 119, at the opposite end of the machine, as shown in Fig. 13, is movably mounted, so that the lock bars 122 can be set in a position, as is the 3rd lock bar, Fig. 13, whereupon when the entire frame 119 is moved to the left by the piston 118, all of the control valves at this lock bar will be locked, for the reason that the lock bar 122, will be moved so close to the control valve stem and its pin P, as seen in the detail view, Fig. 15, that the pins of the valves will engage with the lock bar when said valves start to move downwardly. In other words, all of the lock bars, except those for the number it is desired to print; that is, the number under the heading "Station to," can be pushed inwardly. Then when air is admitted to cylinder 117, the frame 119 carrying all of the lock bars, will be moved to the left and only the control valves whose pins P are projecting into the deeper portions of the notches can be operated. These will be those in position to represent the number of the group of cards last moved through the second stop position at gate G′. If the frame 119, Fig. 13, should be moved with only the third lock bar moved inwardly, all of the valve stems 95, except those in the third row, or near the lock bar which is in, would be free to move downwardly, for the reason that the notches are deep enough to allow their pins to pass therethrough, while the pins on the third lock bar would catch on the bar and these valves could not be operated.

I will now describe the electric circuits used in connection with the control of the machine, referring to the diagrammatic view, Fig. 3, and also describing in connection therewith the general operation of the machine. Main circuit lines A and B are shown at the top and bottom of the figure, leading from any suitable source of electric energy, and provided with a main switch 150. When this main circuit is closed, assuming that there is no card in the first stop position at the gate G, circuit 64 will be complete, energizing magnet 66, which will operate valve 67, which will admit air to the ejector cylinder E, which ejects a card into the first stop position, breaking circuit 64, at 64ª. There being no card in the second stop position G′, circuit 68 will be complete, and magnet M, which operates gate G at the first stop position will be energized. This will permit the first card to be released and carried forwardly to the second stop position G′. This card breaks circuit 68, at 68ª, and gate G at the first stop position again closes, for its magnet M is deënergized. As the card leaves the first stop position, circuit 64 is again completed, magnet 66 is energized to move valve 67, and another card is fed into the first stop position, as before. There is now a card in both stop positions and circuits 65 and 69 are thereby broken, respectively, at 65ª and 69ª. This results in deenergizing relay magnet 151, during the time cards are in both stop positions. Armature 151ª opens, closing circuit 152, which energizes cam wheel control magnet 105, releasing latch 106 and its cam wheel 103. The machine here shown is designed to operate a Burroughs electric adding machine. Cam wheel 103 controls the adding operation of said adding machine. Cam wheel 99 controls air valve 98, and the air supply through pipe 18 to the first air shoe at the first stop position. This cam wheel also operates circuit contacts 99ᵇ and 99ᶜ, mounted thereon. Cam wheel 46 controls air valves 53, 54, and 55. Air valve 53 controls several operations, namely, the supply of air through pipes 56 and 116, to the locking mechanism 119, for locking the control valves not to be used, as hereinbefore referred to; air through pipe 112 to cylinder 113 for moving the card so as to bring the proper heading under the air shoe 70; and air through pipe 71 which operates the air shoe 70, all as hereinbefore described. Air also passes through the branch pipe 62 for operating the non-add key N on the adding machine. Air valve 54 controls the admission of air to cylinder 59 for operating the stroke bar S on the adding machine. An air valve 55 controls the admission of air to cylinder 55′ for operating the total key T on the adding machine. As before stated, these cam wheels 46, 99 and 103 are all on the same shaft 48, which is motor driven, said cam wheels being locked thereto by their driving disks 51, 100 and 104, when the wheels are released by their respective magnets 44, 101 and 105, and the latch hooks thereon catch on the pins of the driving disks, as before described.

In the operation now being described, cam wheel 103 has been released by the energizing of magnet 105, when its circuit 152 was closed by the movement of the armature 151ª to open position, as shown, when card entered the first stop position and broke circuit 65 to magnet 151. Circuit 152 extends to and is provided with two contact members 152ª, at the cam wheel 99, adapted to be closed by a contact plate 153 on said cam wheel 99. When cam wheel 103 is released, it is given a half turn, which results in operating air valve 107, which controls the air supply to the air shoe 70, and through the air block or head 78, for the operation of the keys on the adding machine, as hereinbefore described. Also air valve 89ª is operated to admit air to cylinder 89ᶜ for operating the stroke bar S of the adding machine. Air also passes to cylinder 88 for operating the release latches or stops 84, as hereinbefore described. Assuming that circuit 152 is closed at 152ª, on cam wheel 99, its control magnet 101 is energized and said cam wheel 99 is released and is given a partial turn, during which time it operates air valve 98 for admitting air through pipe 18, to air shoe 11, at the first stop position, for the purpose hereinbefore described. It is assumed, of course, that circuit 152 has been closed at 153, which is a switch or contact adapted to be closed when the adding machine is at rest and to be automatically opened by the adding machine during its operation. The operation of this tabulating machine is so timed that the adding machine can always complete its stroke before further operation of the tabulating machine.

As hereinbefore described, when a card having a different number indicated in a particular field or under a particular heading for the data being tabulated appears at the first stop position, G, the bale 42 is operated by the movement of one of the operating valves 32ª to 41ª, which closes the contact at 43 and thereby closes circuit 154, through magnet 155, through magnet 156, and thence through contact points 157, closed by the plate 158, and thence to the main line. The energizing of magnet 156, closes its armature 156ª, which closes a circuit 154ª to magnet 44 and through to the main line B, providing the contact at 153 has been closed by the adding machine coming to rest. The energizing of magnet 44 releases cam wheel 46, which is given a half turn, during which it operates air valve 53, and air valve 54, for taking the number of the group from the last card thereof which has already passed to the second stop position G′, listing it on the adding machine to the left of the items already taken from the preceding cards, see Fig. 21, and operating the stroke bar S of the adding machine to add said items and print the total thereunder before the first item of the next group of cards is printed.

The energizing of magnet 156 closes its upper armature 156ᵇ, thus directing circuit 154 through said armature 156ᵇ, instead of through contact 43, which circuit operates to keep said magnets 155 and 156 energized when the bale 42 releases contact at 43, which is only momentarily established for this purpose. When magnet 155 is energized, its armature 155ª is moved to open circuit 159, which extends to cam wheel 99, where one branch thereof has contact points at 159ª, adapted to be connected by contact plate 99ᵇ on said cam wheel, said branch extending through to the main line B. The other branch of said circuit 159 extends to magnet M′ and thence to main line A through circuit 69. When the magnets 155 and 156 are energized, as before described, cam wheel 46 has been released by the energizing of magnet 44. While cam wheel 46 is operating to print the number of the group which has just passed the first stop position, and to list the total of the items from said preceding group of cards, the last of which is in the second stop position G', it is necessary to retain said last card in the second stop position at G'. Thereafter circuit 159 is opened at magnet 155, by the movement of its armature 155a. The opening of this circuit 159, deënergizes gate magnet M' and thus prevents the gate G' from being opened to release said last card until after the number of the group to which it belongs, and the total of the items of its group, have been listed on the adding machine. It will be understood that magnets 155 and 156 are only energized during the time the first card of the new group occupies the first stop position, their circuits being closed by the movement of the bale 42, as before described. At other times, and while cards of the same group, with the same group number, are passing through the first stop position, these magnets are deënergized and circuit 159 is closed at the armature 155a. This circuit 159, however, is intermittently closed at the cam wheel 99, by the contact plate 99b for the purpose of energizing magnet M', which opens gate G' to release the cards. The cards of each group are momentarily held in this second stop position for the purpose of listing the desired items on the adding machine. After the total has been taken through the operation of the cam wheel 46, and its air valves 53, 54, and 55, as before described, which operates only when the first card of a new group appears at the first stop position, the last card of the preceding card is released at the second stop position in the following manner. Circuit 154 has been opened by the break 158' in contact plate 158, on cam wheel 46 (Fig. 8), deënergizing magnets 155 and 156, and permitting circuit 159 to be closed at the armature 155a. Preceding this, cam wheel 99 has come to rest with contact plate 99b connecting contacts 159a of circuit 159. This circuit is therefore closed through magnet M' and the gate G' is opened. As the card passes out, it breaks a circuit 160 at 160a, it being understood that this break is arranged in position so that the advancing card will pass between its contacts at 160a. The breaking of circuit 160 deënergizes magnet 161, permitting its armature 162 to open, which establishes circuit 163 around contacts at 160a, separated by the last card. This circuit 163 is completed through magnet 101, which releases cam wheel 99 and permits it to be given a half turn, during which time it operates air valve 98, to admit air to the first air shoe 11, and the cycle of operation is completed and another cycle is started.

Thus it will be understood that the cards are ejected one by one, and stopped at the first stop position, which is a group selecting or group controlling position, operating automatically to cause the group indication to be made and the totals of the items listed from a group to be listed. Only when the first card of a new group comes to the first stop position is cam wheel 46 and its connections operated for this purpose. At the second stop position the mechanism operates to operate the keys of an adding machine for listing the items, designated on the cards by record holes, on the paper of the adding machine connected therewith. When they are so listed in the manner described, the card is moved out of the second position, breaking circuit 160 long enough to establish circuit 163, through magnet 101, to release cam wheel 99, the turning of which starts a new cycle of the operations described.

Many changes can be made in the mechanisms and connections here shown and described for purposes of illustration without departing from the spirit of my invention, and I do not, therefore, limit the invention to the showing made, except as I may be limited by the claims hereto appended.

I claim:

1. In a machine of the character referred to, in combination, card feeding means, automatic card stopping means, pneumatically operated card controlling means, adding mechanism, pneumatic, card-controlled, operating means for selectively operating said adding mechanism, and means for releasing and discharging said card from said machine.

2. In a machine of the character referred to, in combination, adding mechanism, pneumatically operated means for operating the same, electrically operated controlling means for controlling the operation of the pneumatically operated means, said pneumatically operated means and said electric controlling means being controlled by record cards passing through said machine, and means for moving cards therethrough.

3. In a machine of the character referred to, in combination, a card holder, an ejector for ejecting cards one by one, card moving means, card stopping means, means controlled by the cards for classifying data on said cards automatically, adding mechanism, card-controlled pneumatic means for selectively operating said adding mechanism, and means for holding the cards in an operating position for causing the pneumatic operation of said adding mechanism.

4. In a machine of the character referred to, in combination, a card holder, a pneumatic, electrically-controlled ejector, card moving means, means for automatically classifying data on said cards, said means being controlled by the positions of record holes through said cards, an adding and listing machine, card-controlled, pneumatic means for operating said adding and listing machine, whereby to list thereon data from said cards, and means for automatically controlling the movement of the cards through said machine.

5. In combination with a key actuated adding machine, card-controlled pneumatic mechanism for automatically operating the keys of said adding machine to list thereon data indicated on said cards by record holes therethrough, and means for electrically controlling the operation of said mechanism.

6. In combination with an adding and listing machine, a self contained operating mechanism adapted to be connected with said adding and listing machine and comprising card holding and card moving means, card stopping means, pneumatic, data classifying means, controlled by record holes through said cards, pneumatically operated members adapted to engage and operate the keys of said adding and listing machine, and means whereby different areas of said cards can be subjected to said pneumatic mechanism according to the location of the data on said cards.

7. An automatic, pneumatic, card tabulating machine comprising in combination, pneumatically operated, key-actuating elements adapted to be positioned over the keys of an adding machine, means adapted to be controlled by record cards for selectively causing the operation of said key-actuating elements, means for feeding cards in position to control the pneumatic operation of said elements, and means for automatically classifying the data on said cards as they are fed through said machine, substantially as described.

8. In a tabulating machine, in combination, an adding machine, pneumatically operated means for operating the keys thereof, means controlled by record cards having holes therethrough for selectively causing the operation thereof, and electrically controlled means for holding cards in operating position.

9. In combination with an adding machine, means for feeding cards to an operating position, electrically controlled means for holding said cards, pneumatically operated, card-controlled means for operating the keys of said adding machine to list data indicated on said card, and means for moving the cards through said machine one by one.

10. In a tabulating machine, in combination, an adding and listing machine, pneumatically operated means for operating the keys thereof, means controlled by cards having record holes therethrough for selectively causing the operation thereof, means for feeding cards one by one through said machine, electrically controlled means for intermittently stopping said cards in operating positions as they move through said machine, and means controlled by the cards moving through the machine for automatically classifying the data on said cards in the operation of said adding and listing machine, substantially as described.

11. In combination with an adding machine, card-controlled, pneumatic mechanism for automatically operating said adding machine to list thereon data indicated on said cards by record holes therethrough, means for feeding cards one by one through said machine, and electrically controlled means for stopping said cards momentarily in operating position as they move through said machine.

12. In a machine of the character referred to, in combination with an adding and listing machine, a tabulating machine having card-controlled means for pneumatically and selectively operating the keys of said adding and listing machine, means for feeding cards through said machine, electrically controlled means for momentarily stopping said cards in operating positions as they move through said machine, and pneumatically operated means for automatically classifying said cards, whereby the data indicated thereon is listed on said adding and listing machine in classified form, said classifying means being card controlled.

13. In a machine of the character referred to, in combination with an adding and listing machine, a tabulating machine having card-controlled means for pneumatically and selectively operating the keys of said adding and listing machine, means for feeding cards through said machine, means for automatically and momentarily stopping said cards in different operating positions, means controlled by the cards for separating the data as listed on said adding and listing machine in classified form, and means controlled by the cards for operating said adding and listing machine to indicate the classification and totals of the data so listed thereon.

Signed at Portland, Multnomah county, Oregon, this 29th day of May, 1918.

ARTHUR S. TREW.

In presence of—
 H. W. BERG,
 W. R. LITZENBERG.